United States Patent
AbuKhalaf et al.

(10) Patent No.: US 11,114,903 B2
(45) Date of Patent: Sep. 7, 2021

(54) WIRELESS POWER SYSTEMS WITH CONCURRENTLY ACTIVE DATA STREAMS

(71) Applicant: Apple Inc., Cupertino, CA (US)

(72) Inventors: Zaid A. AbuKhalaf, San Jose, CA (US); Juan C. Pastrana, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/814,837

(22) Filed: Mar. 10, 2020

(65) Prior Publication Data

US 2020/0403455 A1 Dec. 24, 2020

Related U.S. Application Data

(60) Provisional application No. 62/865,866, filed on Jun. 24, 2019.

(51) Int. Cl.
| | |
|---|---|
| *H02J 50/80* | (2016.01) |
| *H04L 29/06* | (2006.01) |
| *H04B 5/00* | (2006.01) |
| *H02J 50/12* | (2016.01) |

(52) U.S. Cl.
CPC ............ *H02J 50/80* (2016.02); *H02J 50/12* (2016.02); *H04B 5/0037* (2013.01); *H04L 69/22* (2013.01)

(58) Field of Classification Search
CPC ........ H02J 50/80; H02J 50/12; H04B 5/0037; H04B 5/00; H04L 69/22; H04L 29/06
See application file for complete search history.

(56) References Cited

U.S. PATENT DOCUMENTS

| | | |
|---|---|---|
| 8,098,590 B2 | 1/2012 | Catovic et al. |
| 9,143,003 B2 | 9/2015 | Baarman et al. |
| 9,601,930 B2 | 3/2017 | Walley et al. |
| 9,837,846 B2 | 12/2017 | Partovi |
| 9,843,226 B2 | 12/2017 | Lee et al. |
| 10,541,560 B2 | 1/2020 | Jung et al. |
| 2014/0312833 A1 | 10/2014 | Won et al. |

(Continued)

FOREIGN PATENT DOCUMENTS

| | | |
|---|---|---|
| EP | 3576249 A1 | 12/2019 |
| JP | 2010527226 A | 8/2010 |

(Continued)

*Primary Examiner* — Robert L Deberadinis
(74) *Attorney, Agent, or Firm* — Treyz Law Group, P.C.; Joseph F. Guihan

(57) ABSTRACT

A wireless power system may have a wireless power transmitting device and a wireless power receiving device. The wireless power transmitting device may include a coil and wireless power transmitting circuitry coupled to the coil. The wireless power receiving device may include a coil that is configured to receive wireless power signals from the wireless power transmitting device and rectifier circuitry that is configured to convert the wireless power signals to direct current power. The wireless power transmitting device and the wireless power receiving device may exchange data packets using in-band communication in order to transfer various types of data. For increased flexibility of data transmission, multiple data streams may be used concurrently when conveying data between the power receiving device and power transmitting device. Each data packet may include a stream header that identifies a corresponding data stream. Different types of data may be transmitted with each data stream.

20 Claims, 8 Drawing Sheets

(56) References Cited

U.S. PATENT DOCUMENTS

| | | |
|---|---|---|
| 2016/0233716 A1 | 8/2016 | Lee et al. |
| 2016/0329755 A1 | 11/2016 | Park et al. |
| 2017/0237296 A1 | 8/2017 | Keith et al. |
| 2019/0296591 A1 | 9/2019 | Park |
| 2020/0044694 A1 | 2/2020 | Park |

FOREIGN PATENT DOCUMENTS

| | | |
|---|---|---|
| JP | 2018520630 A | 7/2018 |
| KR | 20080006441 A | 1/2008 |
| WO | 2016024869 A1 | 2/2016 |
| WO | 2016164133 A1 | 10/2016 |
| WO | 2018203652 A1 | 11/2018 |
| WO | 2019133048 A1 | 7/2019 |

|   | $b_7$ | $b_6$ | $b_5$ | $b_4$ | $b_3$ | $b_2$ | $b_1$ | $b_0$ |
|---|---|---|---|---|---|---|---|---|
| $B_0$ | Reserved |||||  Stream Number |||

FIG. 4

WIRELESS POWER SYSTEMS WITH CONCURRENTLY ACTIVE DATA STREAMS

This application claims the benefit of provisional patent application No. 62/865,866, filed Jun. 24, 2019, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat or charging puck wirelessly transmits power to a wireless power receiving device such as a portable electronic device. The portable electronic device has a coil and rectifier circuitry. The coil of the portable electronic device receives alternating-current wireless power signals from the wireless power transmitting device. The rectifier circuitry converts the received signals into direct current power.

SUMMARY

A wireless power system has a wireless power transmitting device and a wireless power receiving device. The wireless power transmitting device may include a coil and wireless power transmitting circuitry coupled to the coil. The wireless power transmitting circuitry may be configured to transmit wireless power signals with the coil. The wireless power receiving device may include a coil that is configured to receive wireless power signals from the wireless power transmitting device and rectifier circuitry that is configured to convert the wireless power signals to direct current power.

The wireless power transmitting device and the wireless power receiving device may exchange data packets in order to transfer various types of data. Authentication data, firmware data, command data, configuration data, and/or power data may be transmitted between the power receiving device and the power transmitting device. The data may be transmitted using in-band communication (e.g., amplitude-shift keying or frequency-shift keying).

For increased flexibility of data transmission, multiple data streams may be used concurrently when conveying data between the power receiving device and power transmitting device. Each data packet may include a stream header that identifies a corresponding data stream. Data transmission using a first data stream may be paused and data transmission using a second data stream may take place. Once data transmission using the second data stream is complete, data transmission using the first data stream may resume. Different types of data may be transmitted with each data stream.

The stream header of each packet may include data bits that identify a corresponding data stream for that data packet. The stream header may be a dedicated stream header (e.g., a 1-byte stream header). Alternatively, data bits indicating the stream number may be incorporated into another byte in the data packet.

BRIEF DESCRIPTION OF THE DRAWINGS

FIG. 4 is a diagram of an illustrative stream header in accordance with an embodiment.

DETAILED DESCRIPTION

A wireless power system includes a wireless power transmitting device such as a wireless charging puck. The wireless power transmitting device wirelessly transmits power to a wireless power receiving device such as a cellular telephone, wristwatch or other electronic equipment. The wireless power receiving device uses power from the wireless power transmitting device for powering the device and for charging an internal battery.

The wireless power transmitting device interacts with the wireless power receiving device and obtains information on the characteristics of the wireless power receiving device. In some embodiments, the wireless power transmitting device has multiple power transmitting coils. In such embodiments, the wireless power transmitting device uses information from the wireless power receiving device and/or measurements made in the wireless power transmitting device to determine which coil or coils in the transmitting device are magnetically coupled to wireless power receiving devices. Coil selection is then performed in the wireless power transmitting device. Wireless power is transmitted from the wireless power transmitting device to the wireless power receiving device using selected coil(s) to charge a battery in the wireless power receiving device and/or to power other load circuitry.

Figure 1:
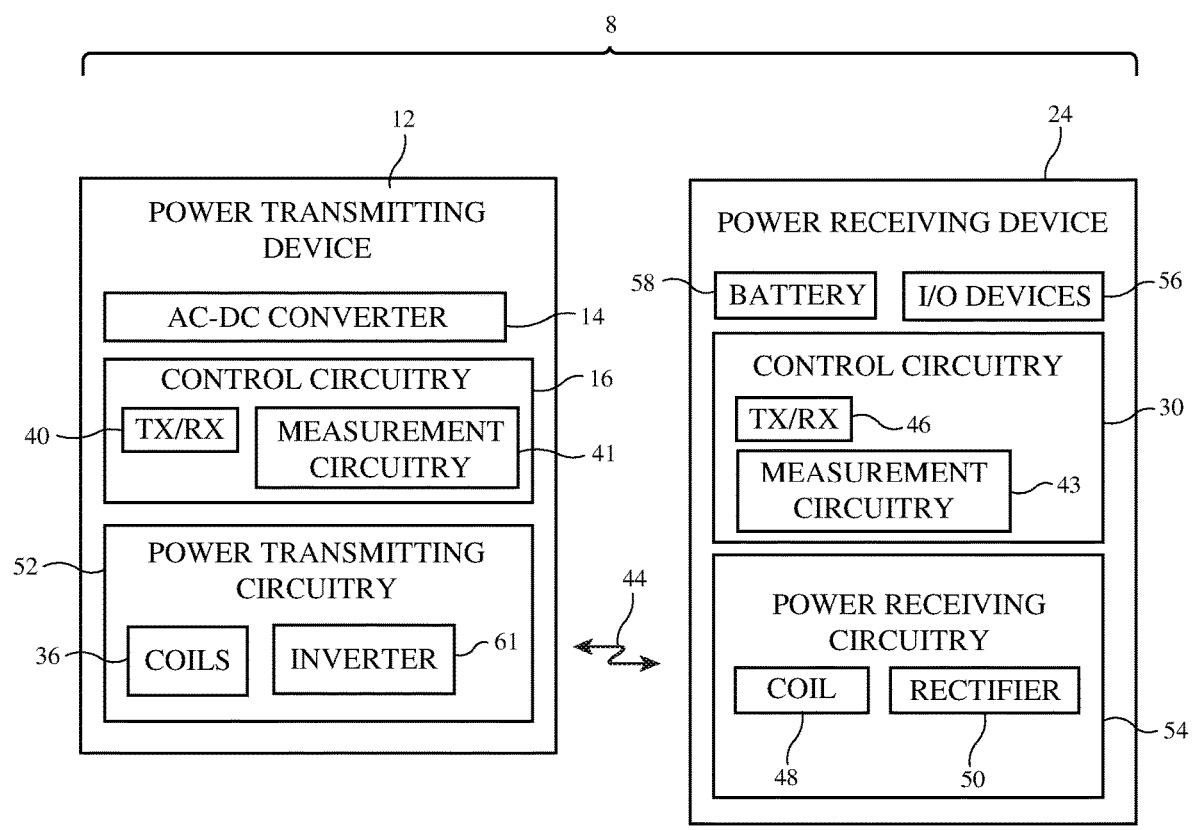
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless power transmitting device that includes power adapter circuitry), may be a wireless charging puck or other device that is coupled to a power adapter or other equipment by a cable, may be a portable device, may be equipment that has been incorporated into furniture, a vehicle, or other system, may be a removable battery case, or may be other wireless power transfer equipment.

Power receiving device 24 may be a portable electronic device such as a cellular telephone, wristwatch, or other electronic equipment. Power transmitting device 12 may be coupled to a wall outlet (e.g., an alternating current power source) and may use AC-DC converter to produce direct-current (DC) power and/or may have a battery for supplying power. In some cases, a single electronic device may be configured to serve as both a power receiving device and a power transmitting device (e.g., the device has both power transmitting circuitry and power receiving circuitry).

The DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from switches such as transistors) that is turned on and off based on control signals provided by control circuitry 16 to create AC current signals through one or more wireless power transmitting coils such as wireless power transmitting coils 36. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 may have only a single coil. In other arrangements, device 12 may have multiple coils (e.g., two or more coils, four or more coils, six or more coils, 2-6 coils, fewer than 10 coils, etc.).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48.

When the alternating-current electromagnetic fields are received by coils 48, corresponding alternating-current currents are induced in coils 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56 such as a display, touch sensor, communications circuits, audio components, sensors, light-emitting diode status indicators, other light-emitting and light detecting components, and other components and these components (which form a load for device 24) may be powered by the DC voltages produced by rectifier circuitry 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48.

It is desirable for power transmitting device 12 and power receiving device 24 to be able to communicate information such as received power, states of charge, and so forth, to control wireless power transfer. However, the above-described technology need not involve the transmission of device identification information in order to function. Out of an abundance of caution, it is noted that to the extent that any implementation of this charging technology involves the use of device identification information (or more generally, personally identifiable information), implementers should follow privacy policies and practices that are generally recognized as meeting or exceeding industry or governmental requirements for maintaining the privacy of users. In particular, identification information data should be managed and handled so as to minimize risks of unintentional or unauthorized access or use, and the nature of authorized use should be clearly indicated to users. Where possible, such identification information may be abstracted, such as by using some but not all bits in a byte of information, so that the resulting identification is not globally unique but still sufficient to facilitate communication under reasonable device usage scenarios.

Control circuitry 16 has external object measurement circuitry 41 that may be used to detect external objects adjacent to device 12 (e.g., on the top of a charging mat or, if desired, to detect objects adjacent to the coupling surface of a charging puck). Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 to determine whether any devices 24 are present on device 12. Additional coils (that are not used for power transmission) and/or other additional sensors may be used for object detection and characterization operations if desired.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured to gather inductance information, Q-factor information, etc.) and signal detection circuitry (e.g., filters, analog-to-digital converters, impulse response measurement circuits, etc.). During measurement operations, switching circuitry in device 12 (e.g., in the puck of device 12) may be adjusted by control circuitry 16 to switch each of coils 36 into use. As each coil 36 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements (e.g., so that this information can be used by device 24 and/or device 12).

Figure 2:
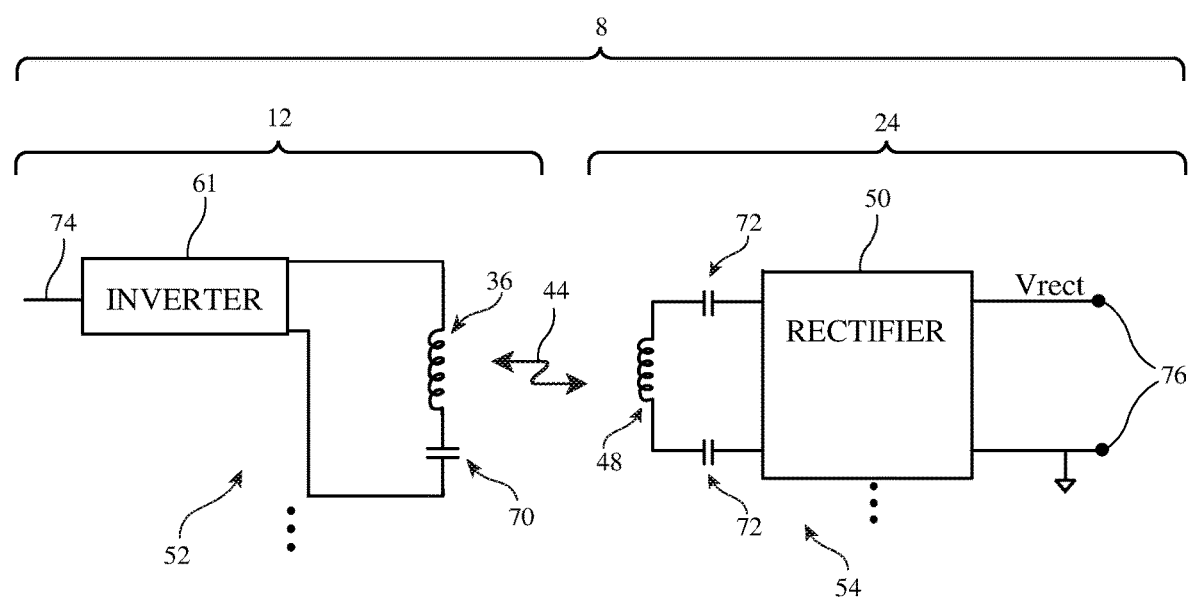
FIG. 2 is a circuit diagram of illustrative wireless power transmitting and receiving circuitry in accordance with an embodiment.

FIG. 2 is a circuit diagram of illustrative wireless charging circuitry for system 8. As shown in FIG. 2, circuitry 52 may include inverter circuitry such as one or more inverters 61 or other drive circuitry that produces wireless power signals that are transmitted through an output circuit that includes one or more coils 36 and capacitors such as capacitor 70. In some embodiments, device 12 may include multiple individually controlled inverters 61, each of which supplies drive signals to a respective coil 36. In other embodiments, an inverter 61 is shared between multiple coils 36 using switching circuitry.

During operation, control signals for inverter(s) 61 are provided by control circuitry 16 at control input 74. A single inverter 61 and single coil 36 is shown in the example of FIG. 2, but multiple inverters 61 and multiple coils 36 may be used, if desired. In a multiple coil configuration, switching circuitry (e.g., multiplexer circuitry) can be used to couple a single inverter 61 to multiple coils 36 and/or each coil 36 may be coupled to a respective inverter 61. During wireless power transmission operations, transistors in one or more selected inverters 61 are driven by AC control signals from control circuitry 16. The relative phase between the inverters can be adjusted dynamically (e.g., a pair of inverters 61 may produce output signals in phase or out of phase (e.g., 180° out of phase)).

The application of drive signals using inverter(s) 61 (e.g., transistors or other switches in circuitry 52) causes the output circuits formed from selected coils 36 and capacitors 70 to produce alternating-current electromagnetic fields (signals 44) that are received by wireless power receiving circuitry 54 using a wireless power receiving circuit formed from one or more coils 48 and one or more capacitors 72 in device 24.

If desired, the relative phase between driven coils 36 (e.g., the phase of one of coils 36 that is being driven relative to another adjacent one of coils 36 that is being driven) may be adjusted by control circuitry 16 to help enhance wireless power transfer between device 12 and device 24. Rectifier circuitry 50 is coupled to one or more coils 48 (e.g., a pair of coils) and converts received power from AC to DC and supplies a corresponding direct current output voltage Vrect across rectifier output terminals 76 for powering load circuitry in device 24 (e.g., for charging battery 58, for powering a display and/or other input-output devices 56, and/or for powering other components). A single coil 48 or multiple coils 48 may be included in device 24. In an illustrative configuration, device 24 may be a wristwatch or other portable device with at least two coils 48. These two (or more) coils 48 may be used together when receiving wireless power. Other configurations may be used, if desired.

As previously mentioned, in-band transmissions using coils 36 and 48 may be used to convey (e.g., transmit and receive) information between devices 12 and 24. With one illustrative configuration, frequency-shift keying (FSK) is used to transmit in-band data from device 12 to device 24 and amplitude-shift keying (ASK) is used to transmit in-band data from device 24 to device 12. Power may be conveyed wirelessly from device 12 to device 24 during these FSK and ASK transmissions. While power transmitting circuitry 52 is driving AC signals into one or more of coils 36 to produce signals 44 at the power transmission frequency, wireless transceiver circuitry 40 may use FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 monitors the frequency of the AC signal passing through coil(s) 48 and uses FSK demodulation to extract the transmitted in-band data from signals 44. This approach allows FSK data (e.g., FSK data packets) to be transmitted in-band from device 12 to device 24 with coils 36 and 48 while power is simultaneously being wirelessly conveyed from device 12 to device 24 using coils 36 and 48.

In-band communications between device 24 and device 12 may use ASK modulation and demodulation techniques. Wireless transceiver circuitry 46 transmits in-band data to device 12 by using a switch (e.g., one or more transistors in transceiver 46 that are coupled to coil 48) to modulate the impedance of power receiving circuitry 54 (e.g., coil 48). This, in turn, modulates the amplitude of signal 44 and the amplitude of the AC signal passing through coil(s) 36. Wireless transceiver circuitry 40 monitors the amplitude of the AC signal passing through coil(s) 36 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 36 while power is simultaneously being wirelessly conveyed from device 12 to device 24 using coils 36 and 48.

The example of FSK modulation being used to convey in-band data from power transmitting device 12 to power receiving device 24 and ASK modulation being used to convey in-band data from power receiving device 24 to power transmitting device 12 is merely illustrative. In general, any desired communication techniques may be used to convey information from power transmitting device 12 to power receiving device 24 and from power receiving device 24 to power transmitting device 12.

The aforementioned FSK and ASK modulation and demodulation techniques may be used to transmit data packets between device 12 and device 24. Each data packet may include numerous data bits (sometimes referred to as bits). The data bits may be grouped into bytes, with each byte including any desired number of bits (e.g., 8 bits).

Data packets may be transmitted between devices in a data stream. There are many types of data that may be transmitted between a wireless power transmitting device and a wireless power receiving device. As examples, transmitted data may include authentication data, a firmware update, a command, configuration data, power data (e.g., received power levels, states of charge, etc.) or any other desired type of data.

Authentication may occur when the wireless power receiving device is placed on the wireless power transmitting device. Authentication may involve verifying that the wireless power receiving device is supported by the wireless power transmitting device and/or verifying that the wireless power receiving device and the wireless power transmitting device belong to the same user (e.g., both devices are associated with the same user identification). Authentication may also involve establishing encryption to protect the transmitted data. These examples are merely illustrative and other information may be transmitted during authentication.

A firmware update may be, for example, transmitted from a wireless power receiving device to a wireless power transmitting device (or vice versa). Commands may be transmitted between the wireless power receiving device and the wireless power transmitting device. An exemplary command that may be transmitted is an instruction to update a user-interface. For example, the wireless power transmitting device may transmit a command to the wireless power receiving device with an instruction to indicate that wireless power transfer has commenced (e.g., using an input-output device 56 of the wireless power receiving device such as a display, or camera flash).

Configuration data may, for example, be transmitted from the wireless power transmitting device to the wireless power receiving device. The configuration data may include information regarding the configuration of the wireless power transmitting device (e.g., the model number and shape of the wireless power transmitting device).

To summarize, there are many different types of data that may be transmitted between devices 12 and 24. However, in some communication schemes, there may only be one active data stream per communication direction using in-band communication between devices 12 and 24. This limits the devices to transmitting only one type of data at a time. Data packets may be transmitted using the data stream until all of the pertinent data packets have been successfully transmitted. After the transmission is complete, transmission of additional packets of a different type may begin. This type of communication scheme may have limited flexibility. Once transmission of a first type of data begins, transmission must continue until all of that data has been transmitted (even if there is high priority data of a different type to be transmitted).

Consider an example where a wireless power receiving device is placed on a wireless power transmitting device. When the power receiving device is placed on the power transmitting device, authentication may begin (with authentication data being transmitted between devices 12 and 24). A single data stream may be used to transmit the authentication data. In the meantime, devices 12 and 24 may wish to exchange data regarding a user-interface update. However, since only one active data stream is permitted, the authentication must be completed before the user-interface update commands are exchanged. In other words, data transfer of different types must be completed serially.

To increase flexibility of data communication, a communication scheme may be used that allows for multiple active data streams. This allows for more control over the transmission of different types of information. In the above example, transmission of authentication data using a first data stream may be paused and data regarding the user-interface update may be transmitted using a second data stream. Once the data regarding the user-interface update is transmitted, the transmission of authentication data using the first data stream may be resumed.

Figure 3A:
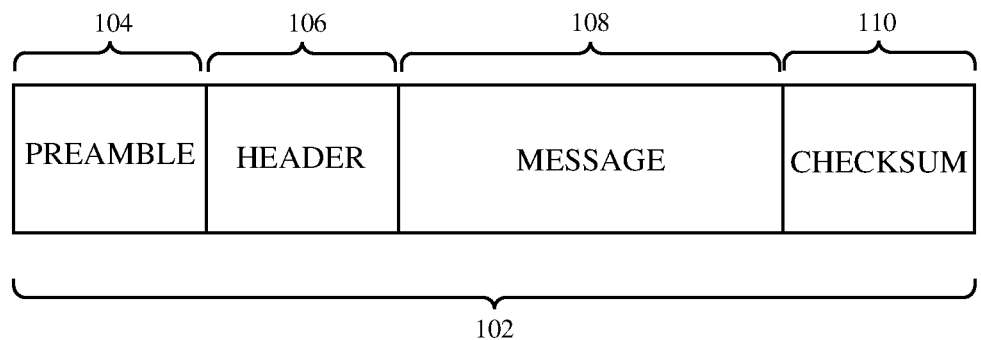
FIG. 3A is a diagram of an illustrative data packet that may be conveyed between a wireless power transmitting device and a wireless power receiving device in accordance with an embodiment.

FIG. 3A is a diagram of an illustrative data packet. As shown in FIG. 3A, the data packet may optionally include a preamble 104 (e.g., a preamble byte), header 106 (e.g., a header byte), message 108 (e.g., one or more message bytes), and checksum 110 (e.g., a checksum byte). Preamble 104 may include a sequence of bits that enables the data-packet-receiving-device to accurately detect the start bit of the header. Header 106 may indicate the type of data packet that is being transmitted. Message 108 (sometimes referred to as payload 108) includes the data that is desired to be transmitted. Checksum 110 allows for verification that the entire packet was transmitted successfully. The device receiving the packet may calculate a checksum value for the packet and compare the calculated checksum value to a target checksum value received in the checksum byte. If the calculated checksum value and the target checksum value match, the packet is interpreted as being transmitted successfully. If the calculated checksum value and the target checksum value do not match, the packet transmission is interpreted as including an error.

Figure 3B:
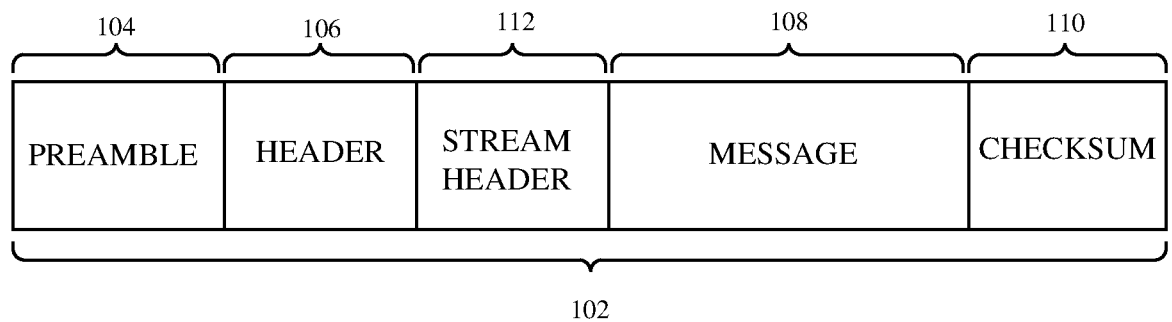
FIG. 3B is a diagram of an illustrative data packet having a stream header that may be conveyed between a wireless power transmitting device and a wireless power receiving device in accordance with an embodiment.

To allow for concurrently active data streams, the in-band communication data packets may be modified to include stream identifying information. FIG. 3B is a diagram of an illustrative data packet that includes a stream header to enable multiple active data streams. As shown in FIG. 3B, data packet 102 may include a stream header 112. The stream header 112 may be transmitted after header 106 but before message 108. This example is merely illustrative and the stream header may be transmitted at another position within the packet if desired. The preamble depicted in FIGS. 3A and 3B is optional and may be omitted if desired.

FIG. 4 is a diagram of an illustrative stream header that may be included in a data packet. As shown, stream header 112 includes one byte (Bo) that has eight bits ($b_0$, $b_1$, etc.). The first three bits of the stream header (bits $b_0$, $b_1$, and $b_2$) are used to identify a stream number for the data packet. In this example, the three identifying bits allow for eight active streams. In other words, a stream number of 0, 1, 2, 3, 4, 5, 6, or 7 will be identified using bits $b_0$-$b_2$. The remaining five bits of the stream header may be reserved. This example of a stream header is merely illustrative. In general, any desired number of bits (e.g., one, two, three, four, more than four, etc.) may be used to identify a stream number.

There are numerous types of data packets that may be transmitted during operation of the one or more data streams. Auxiliary data control (ADC) packets may be used to open and close (activate and deactivate) data streams.

Auxiliary data transport (ADT) packets may be used to transmit data using an active data stream. Data stream response (DSR) packets may allow acknowledgments to be transmitted upon successful receipt of data. All of these types of packets may include a stream header or other stream identifying information.

Figure 5:
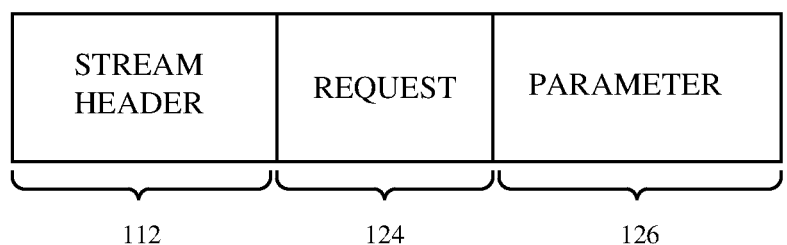
FIG. 5 is a diagram of an illustrative auxiliary data control packet having a 1-byte stream header in accordance with an embodiment.

FIG. 5 is a diagram of an illustrative auxiliary data control packet with a stream header. As shown in FIG. 5, auxiliary data control packet 122 includes stream header 112, request 124, and parameter 126. Request 124 and parameter 126 may be used to provide information regarding a desired control for the data stream identified by stream header 112. For example, the auxiliary data control packet may be used to open data transport using the data stream identified in stream header 112 (i.e., open the identified data stream), may be used to close data transport using the data stream identified in stream header 112 (i.e., close the identified data stream), or may be used to reset all incoming and outgoing data streams.

Figure 6:
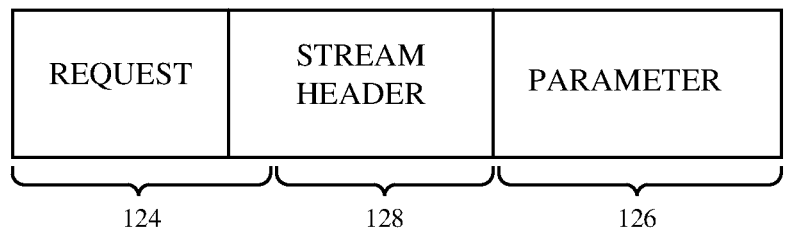
FIG. 6 is a diagram of an illustrative auxiliary data control packet having bits that represent a stream number in accordance with an embodiment.

In FIG. 5, stream header 112 may be a dedicated stream header. One or more bytes may be used solely for stream header 112 (e.g., a byte having 8 bits as shown in FIG. 4). Request 124 may have a 5 bits and parameter 126 may have 11 bits. In other words, two additional bytes (each having 8 bits) are split between the request and parameter. This example, however, is merely illustrative. In another possible arrangement, shown in FIG. 6, the request 124, stream number 128, and parameter 126 may be split between two bytes. As shown in FIG. 6, a dedicated 1-byte stream header is not included as in FIG. 5. Instead, the stream number 128 is included in the packet between request 124 and parameter 126. The stream number 128 may be 3 bits (or any other desired number of bits) that identifies a corresponding stream number. Request 124 may have 2 bits and parameter 126 may have 11 bits. In general, a byte may include any other desired information in addition to the stream number.

In some embodiments, stream header 112 has 8 bits. In some embodiments, stream header 112 has 16 bits. In some embodiments, stream header 112 has 24 bits. In some embodiments, stream header 112 has 32 bits. In some embodiments, stream header 112 has 48 bits. In some embodiments, stream header 112 has 64 bits. In general, stream header 112 may include as many bits as desired. In some embodiments, 1 bit is used to identify a stream number. In some embodiments, 2 bits are used to identify a stream number. In some embodiments, 3 bits are used to identify a stream number. In some embodiments, 4 bits are used to identify a stream number. In some embodiments, 5 bits are used to identify a stream number. In some embodiments, 6 bits are used to identify a stream number. In some embodiments, 7 bits are used to identify a stream number. It is noted that as long as there are sufficient bits, any combination of stream identification bits and stream header length can be implemented. For example, in a 8 bit stream header, anywhere between 1 to 8 bits can be reserved for stream identification. In a 16 bit stream header, anywhere between 1 to 16 bits can be reserved for stream identification. In a 24 bit stream header, anywhere between 1 to 24 bits can be reserved for stream identification. In a 32 bit stream header, anywhere between 1 to 32 bits can be reserved for stream identification. In a 48 bit stream header, anywhere between 1 to 48 bits can be reserved for stream identification. In a 64 bit stream header, anywhere between 1 to 64 bits can be reserved for stream identification.

The examples of auxiliary data control packets in FIGS. 5 and 6 are merely illustrative. It should be understood that any of these packets may optionally include the preamble, header, and/or checksum of FIGS. 3A and 3B.

Figure 7:
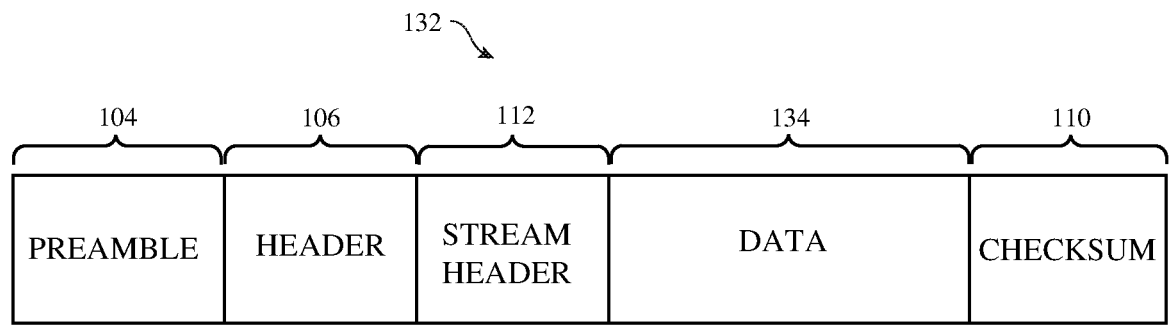
FIG. 7 is a diagram of an illustrative auxiliary data transport packet having a 1-byte stream header in accordance with an embodiment.

FIG. 7 is a diagram of an illustrative auxiliary data transport packet with a stream header. As shown in FIG. 7, auxiliary data transport packet 132 may include preamble 104, header 106, a stream header 112, data 134, and checksum 110. Stream header 112 may be a dedicated stream header formed from one or more bytes (e.g., as shown in FIG. 4). Data 134 may include one or more bytes of data. The device that is receiving the data (which may be either power transmitting device 12 or power receiving device 24) extracts the data and, according to the stream number identified by the stream header, appends the data to a corresponding stream buffer. As previously mentioned, the type of data included in data 134 may include authentication data, firmware update data, command data, configuration data, power data, etc.

Figure 8:
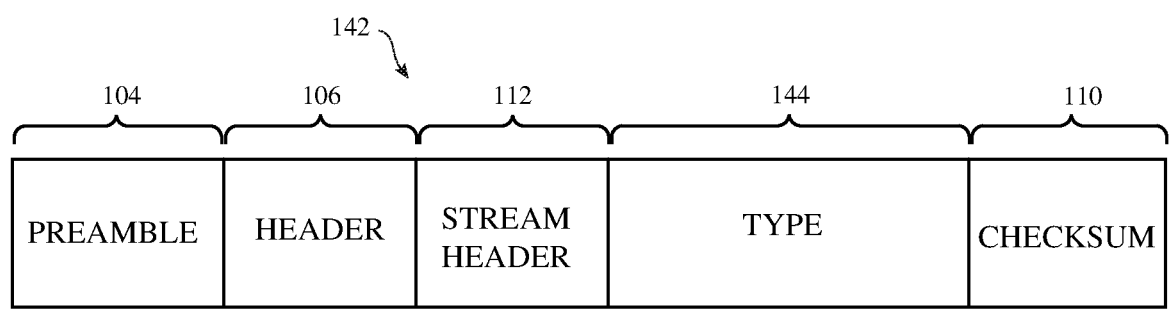
FIG. 8 is a diagram of an illustrative data stream response packet having a 1-byte stream header in accordance with an embodiment.

FIG. 8 is a diagram of an illustrative data stream response packet with a stream header. As shown in FIG. 8, data stream response packet 142 includes preamble 104, header 106, stream header 112, type 144 (sometimes referred to as response 144 or response type 144), and checksum 110. Type 144 may be used to provide a desired data stream response. For example, the data stream response may be used to acknowledge receipt of a data packet or may be used to transmit a poll to prompt transmission of data.

Figure 9:
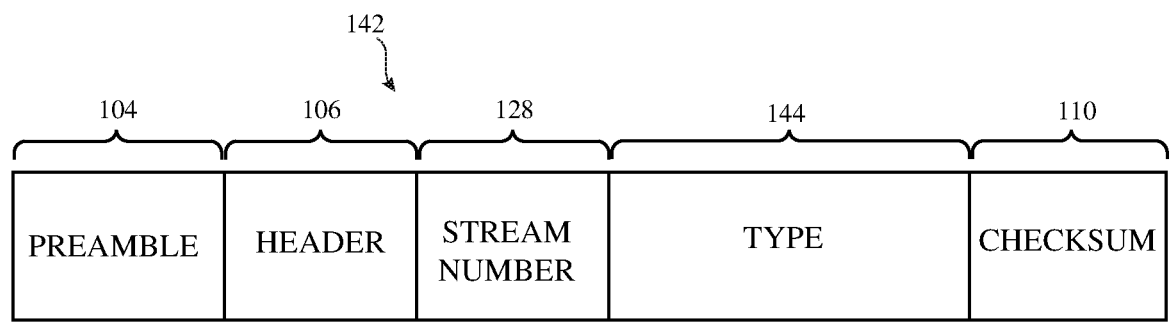
FIG. 9 is a diagram of an illustrative data stream response packet having bits that represent a stream number in accordance with an embodiment.

In FIG. 8, stream header 112 may be a dedicated stream header formed from one or more bytes (e.g., a byte having 8 bits as shown in FIG. 4). Response type 144 may be 1 byte having 8 bits. This example, however, is merely illustrative. In another possible arrangement, shown in FIG. 9, the stream number 128 and type 144 may be split between a single byte. In this example, stream number 128 includes 3 bits (or any other desired number of bits) that identify a corresponding stream number. Type 144 may have five bits (or any other desired number of bits).

Figure 10:
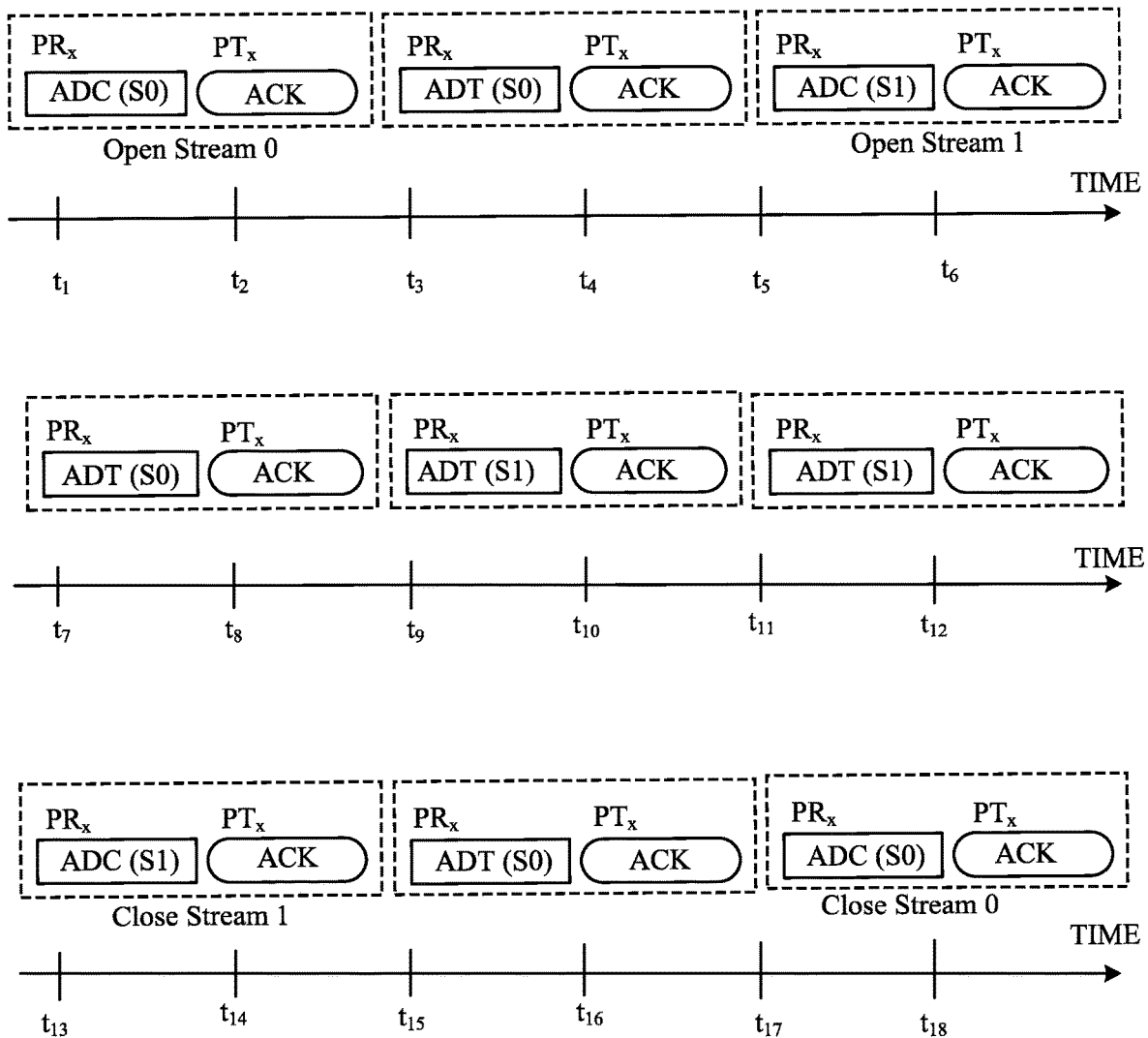
FIG. 10 is a diagram showing an illustrative method of transmitting data from a wireless power receiving device to a wireless power transmitting device using multiple data streams that are simultaneously active in accordance with an embodiment.

FIG. 10 is a diagram showing a method of transmitting information from a wireless power receiving device to a wireless power transmitting device using multiple data streams that are simultaneously active. As shown in FIG. 10, an auxiliary data control (ADC) packet may be transmitted from the wireless power receiving device 24 to wireless power transmitting device 12 at $t_1$. The ADC packet may include a command to open stream 0. After receiving the command, the wireless power transmitting device may transmit an acknowledgement to the wireless power receiving device at $t_2$.

At $t_3$, an auxiliary data transport (ADT) packet may be transmitted from the wireless power receiving device 24 to wireless power transmitting device 12. The auxiliary data transport packet may include a stream header indicating that the data is associated with stream 0. After receiving the auxiliary data transport packet (and appending the data packet to the corresponding stream buffer), the wireless power transmitting device may transmit an acknowledgement to the wireless power receiving device at $t_4$.

An auxiliary data control (ADC) packet may be transmitted from the wireless power receiving device 24 to wireless power transmitting device 12 at $t_5$. The ADC packet may include a command to open stream 1. After receiving the command, the wireless power transmitting device may transmit an acknowledgement to the wireless power receiving device at $t_6$.

At $t_7$, an auxiliary data transport packet may be transmitted from the wireless power receiving device 24 to wireless power transmitting device 12. The auxiliary data transport packet may include a stream header indicating that the data is associated with stream 0. After receiving the auxiliary data transport packet (and appending the data packet to the corresponding stream buffer), the wireless power transmitting device may transmit an acknowledgement to the wireless power receiving device at $t_8$.

At $t_9$, an auxiliary data transport packet may be transmitted from the wireless power receiving device 24 to wireless power transmitting device 12. The auxiliary data transport packet may include a stream header indicating that the data is associated with stream 1. After receiving the auxiliary data transport packet (and appending the data packet to the corresponding stream buffer), the wireless power transmitting device may transmit an acknowledgement to the wireless power receiving device at $t_{10}$. This process may be repeated with an additional auxiliary data transport packet associated with stream 1 transmitted at $t_{11}$.

An auxiliary data control packet may be transmitted from the wireless power receiving device 24 to wireless power transmitting device 12 at $t_{13}$. The ADC packet may include a command to close stream 1. After receiving the command, the wireless power transmitting device may transmit an acknowledgement to the wireless power receiving device at $t_{14}$.

At $t_{15}$, an auxiliary data transport (ADT) packet may be transmitted from the wireless power receiving device 24 to wireless power transmitting device 12. The auxiliary data transport packet may include a stream header indicating that the data is associated with stream 0. After receiving the auxiliary data transport packet (and appending the data packet to the corresponding stream buffer), the wireless power transmitting device may transmit an acknowledgement to the wireless power receiving device at $t_{16}$.

An auxiliary data control packet may be transmitted from the wireless power receiving device 24 to wireless power transmitting device 12 at $t_{17}$. The ADC packet may include a command to close stream 0. After receiving the command, the wireless power transmitting device may transmit an acknowledgement to the wireless power receiving device at $t_{18}$.

Figure 11:
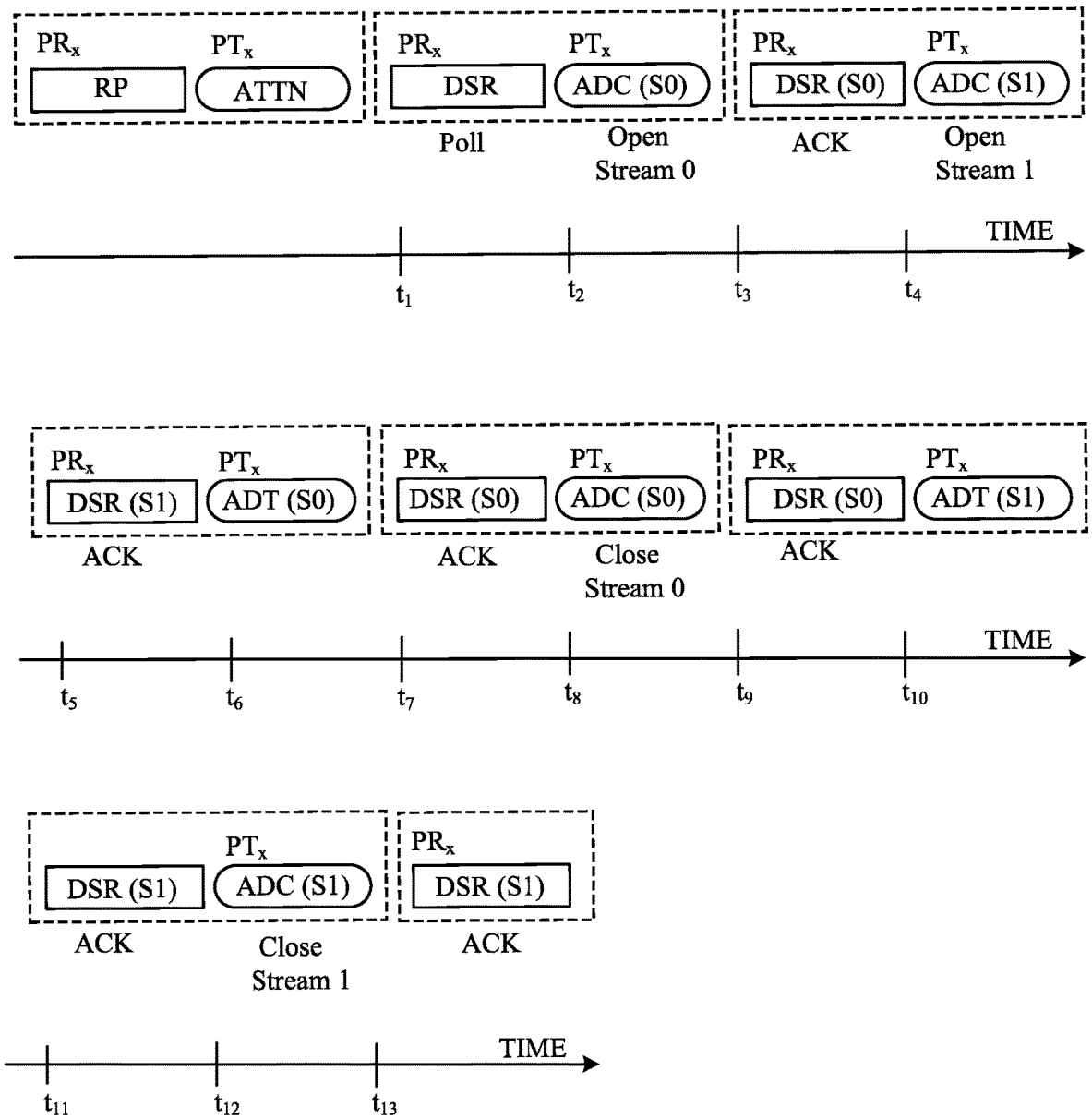
FIG. 11 is a diagram showing an illustrative method of transmitting data from a wireless power transmitting device to a wireless power receiving device using multiple data streams that are simultaneously active in accordance with an embodiment.

FIG. 11 is a diagram showing a method of transmitting information from a wireless power transmitting device to a wireless power receiving device using multiple data streams that are simultaneously active. Before $t_1$, the wireless power transmitting device and wireless power receiving device may both be in standby states (e.g., waiting for in-band communication to be initiated). At $t_1$, a data stream response (DSR) packet may be transmitted from the wireless power receiving device to the wireless power transmitting device. The DSR packet may poll the power transmitting device to initiate data transfer from the power transmitting device to the power receiving device. At $t_2$, an auxiliary data control (ADC) packet may be transmitted from the wireless power transmitting device 12 to wireless power receiving device 24. The ADC packet may include a command to open stream 0.

At $t_3$, a data stream response (DSR) packet may be transmitted from the wireless power receiving device to the wireless power transmitting device. The DSR packet may acknowledge the wireless power transmitter opening stream 0 and may invite further data transmissions from the wireless power transmitter. At $t_4$, an auxiliary data control (ADC) packet may be transmitted from the wireless power transmitting device 12 to wireless power receiving device 24. The ADC packet may include a command to open stream 1.

At $t_5$, a data stream response (DSR) packet may be transmitted from the wireless power receiving device to the wireless power transmitting device. The DSR packet may acknowledge the wireless power transmitter opening stream 1 and may invite further data transmissions from the wireless power transmitter. An auxiliary data transport packet may be transmitted from the wireless power transmitting device 12 to wireless power receiving device 24 at $t_6$. The auxiliary data transport packet may include a stream header indicating that the data is associated with stream 0.

At $t_7$, a data stream response (DSR) packet may be transmitted from the wireless power receiving device to the wireless power transmitting device. The DSR packet may acknowledge the stream 0 data received from the ADT packet and may invite further data transmissions from the wireless power transmitter. An auxiliary data control packet may be transmitted from the wireless power transmitting device 12 to wireless power receiving device 24 at $t_8$. The ADC packet may include a command to close stream 0.

At $t_9$, a data stream response (DSR) packet may be transmitted from the wireless power receiving device to the wireless power transmitting device. The DSR packet may acknowledge the wireless power transmitter closing stream 0 and may invite further data transmissions from the wireless power transmitter. An auxiliary data transport packet may be transmitted from the wireless power transmitting device 12 to wireless power receiving device 24 at $t_{10}$. The auxiliary data transport packet may include a stream header indicating that the data is associated with stream 1.

At $t_{11}$, a data stream response (DSR) packet may be transmitted from the wireless power receiving device to the wireless power transmitting device. The DSR packet may acknowledge the stream 1 data received from the ADT packet and may invite further data transmissions from the wireless power transmitter. An auxiliary data control packet may be transmitted from the wireless power transmitting device 12 to wireless power receiving device 24 at $t_{12}$. The ADC packet may include a command to close stream 1.

At $t_{13}$, a data stream response (DSR) packet may be transmitted from the wireless power receiving device to the wireless power transmitting device. The DSR packet may acknowledge the wireless power transmitter closing stream 0.

Each active data stream may have a corresponding stream buffer (sometimes referred to as buffer). The control circuitry of the device receiving the data packets may take action based on the data received in the data streams. The control circuitry may take a first action based on information from the first data stream and may take a second action that is different than the first action based on information from the second data stream. The actions taken by the control circuitry may be any desired type of action (e.g., modifying a power transmission characteristic, updating an input-output component, transmitting additional data, etc.).

The specific examples of FIGS. 10 and 11 of when the streams are opened and closed are merely illustrative. FIGS. 10 and 11 show how data streams may be independently opened and closed at any desired time while conveying data between the wireless power receiving device and the wireless power transmitting device. Each data stream may be opened to convey data of a certain type (e.g., authentication data, a firmware update, a command, configuration data, power data, etc.). By allowing multiple active data streams, the system has increased flexibility to convey different types of data at desired times.

For example, a first data stream (e.g., data stream 0) may be used to convey authentication data (e.g., data of a first type), a second data stream (e.g., data stream 1) may be used to convey a command (e.g., data of a second type), etc. Certain types of data may take longer to transmit than other types of data. For example, transmitting data for a firmware update may take hours (e.g., more than one hour, more than two hours, etc.), transmitting authentication data may take minutes (e.g., more than one minute), and transmitting a command may take seconds (e.g., more than one second). These timeframes are merely illustrative. A firmware update may be transmitted using blocks of data. Transmitting each block of data may take more than ten seconds, more than fifteen seconds, between fifteen and twenty-five seconds, or any other length of time. The stream headers described herein allow for a firmware update (e.g., transmission of a firmware update block) or authentication to be paused to allow for transmission of a command. This allows the command to be transmitted immediately instead of waiting for the firmware update or authentication to complete before transmitting the command. Said another way, transmission of lower priority data may be paused to allow for transmission of higher priority data. Control circuitry 16 and 30 in devices 12 and 24 may prioritize different types of data in any desired manner.

The foregoing is merely illustrative and various modifications can be made to the described embodiments. The foregoing embodiments may be implemented individually or in any combination.

What is claimed is:

1. A wireless power transmitting device with a charging surface configured to receive at least one wireless power receiving device, the wireless power transmitting device comprising:
   a coil;
   wireless power transmitting circuitry coupled to the coil and configured to transmit wireless power signals with the coil; and
   control circuitry configured to convey data packets using the coil, wherein each of the data packets has a stream header that identifies a corresponding data stream associated with that data packet.

2. The wireless power transmitting device of claim 1, wherein the control circuitry is configured to:
   convey a first data packet for a first data stream using the coil; and
   while the first data stream is active, convey a second data packet for a second data stream using the coil.

3. The wireless power transmitting device of claim 2, wherein the first data packet has a respective first stream header that identifies the first data stream and wherein the second data packet has a respective second stream header that identifies the second data stream.

4. The wireless power transmitting device of claim 2, wherein the control circuitry is configured to convey data of a first type using the first data stream and wherein the control circuitry is configured to convey data of a second type that is different than the first type using the second data stream.

5. The wireless power transmitting device of claim 1, wherein each of the data packets has a header, a payload, and a checksum.

6. The wireless power transmitting device of claim 1, wherein the stream header includes three data bits that identify a stream number.

7. The wireless power transmitting device of claim 1, wherein the data packets comprise data bits and wherein the control circuitry is configured to:
   gather measurements using the coil;
   demodulate at least portions of the measurements into the data bits.

8. The wireless power transmitting device of claim 1, wherein the control circuitry is configured to:
   receive a first data packet for a first data stream using the coil;
   while the first data stream is active, receive a second data packet for a second data stream using the coil;
   perform a first action based on information from the first data stream;
   perform a second action that is different than the first action based on information from the second data stream;
   append the first data packet to a first buffer that is associated with the first data stream; and
   append the second data packet to a second buffer that is associated with the second data stream.

9. An electronic device that is configured to receive wireless power from a power transmitting device, the electronic device comprising:
   a coil that is configured to receive wireless power signals from the power transmitting device;
   rectifier circuitry that is configured to convert the wireless power signals to direct current power; and
   control circuitry configured to convey data packets using the coil, wherein each of the data packets has a stream header that identifies a corresponding data stream associated with that data packet.

10. The electronic device of claim 9, wherein the control circuitry is configured to:
    convey a first data packet for a first data stream using the coil; and
    while the first data stream is active, convey a second data packet for a second data stream using the coil.

11. The electronic device of claim 10, wherein the first data packet has a respective first stream header that identifies the first data stream and wherein the second data packet has a respective second stream header that identifies the second data stream.

12. The electronic device of claim 10, wherein the control circuitry is configured to convey data of a first type using the first data stream and wherein the control circuitry is configured to convey data of a second type that is different than the first type using the second data stream.

13. The electronic device of claim 9, wherein each of the data packets has a header, a payload, and a checksum.

14. The electronic device of claim 9, wherein the stream header includes three data bits that identify a stream number.

15. The electronic device of claim 9, wherein the data packets comprise data bits and wherein the control circuitry is configured to:
    gather measurements using the coil;
    demodulate at least portions of the measurements into the data bits.

16. The electronic device of claim 9, wherein the control circuitry is configured to:
    receive a first data packet for a first data stream using the coil;
    while the first data stream is active, receive a second data packet for a second data stream using the coil;
    perform a first action based on information from the first data stream;
    perform a second action that is different than the first action based on information from the second data stream;
    append the first data packet to a first buffer that is associated with the first data stream; and
    append the second data packet to a second buffer that is associated with the second data stream.

17. A wireless power transmitting device with a charging surface configured to receive at least one wireless power receiving device, the wireless power transmitting device comprising:
  a coil;
  wireless power transmitting circuitry coupled to the coil and configured to transmit wireless power signals with the coil; and
  control circuitry configured to:
    transmit a first data packet for a first data stream to the wireless power receiving device using the coil; and
    while the first data stream is active, transmit a second data packet for a second data stream to the wireless power receiving device using the coil.

18. The wireless power transmitting device of claim 17, wherein the first data packet includes at least some bits that identify the first data stream and wherein the second data packet includes at least some bits that identify the second data stream.

19. The wireless power transmitting device of claim 17, wherein the first data packet includes a 1-byte stream header that identifies the first data stream and wherein the second data packet includes a 1-byte stream header that identifies the second data stream.

20. The wireless power transmitting device of claim 17, wherein each of the first and second data packets includes a preamble, a header, a stream header, a payload, and a checksum.

\* \* \* \* \*